United States Patent [19]
Buer

[11] Patent Number: 5,835,599
[45] Date of Patent: Nov. 10, 1998

[54] MUTI-CYCLE NON-PARALLEL DATA ENCRYPTION ENGINE

[75] Inventor: Mark Leonard Buer, Chandler, Ariz.

[73] Assignee: VLSI Technology, Inc., San Jose, Calif.

[21] Appl. No.: 632,611

[22] Filed: Apr. 15, 1996

[51] Int. Cl.[6] .................................................. H04L 9/00
[52] U.S. Cl. ............................................ 380/29; 380/37
[58] Field of Search ........................................ 380/29, 37

[56] References Cited

U.S. PATENT DOCUMENTS

| | | | |
|---|---|---|---|
| 4,160,120 | 7/1979 | Barnes et al. | 380/29 |
| 4,731,843 | 3/1988 | Holmquist | 380/29 |
| 4,802,217 | 1/1989 | Michener | 380/29 |
| 5,003,597 | 3/1991 | Merkle | 380/29 |
| 5,351,299 | 9/1994 | Matsuzaki et al. | 380/29 |
| 5,381,680 | 1/1995 | Butter et al. | 380/37 |
| 5,442,705 | 8/1995 | Miyano | 380/29 |
| 5,592,553 | 1/1997 | Guski et al | 380/29 |
| 5,671,284 | 9/1997 | Buer | 380/29 |
| 5,687,237 | 11/1997 | Naclerio | 380/29 |
| 5,687,238 | 11/1997 | Shimada | 380/29 |

*Primary Examiner*—Salvatore Cargialosi
*Attorney, Agent, or Firm*—Wagner, Murabito & Hao

[57] ABSTRACT

A multi-cycle, non-parallel DES encryption scheme that supports CBC, OFB, CFB, and ECB modes of operation. Three independent cipher stages are coupled together in series in order to implement a high-speed DES core. Sixteen cipher operations are required for DES encryption and decryption. Hence, the data is routed through the DES core five times. On the sixth pass, the encrypted/decrypted data is taken from the output of the first cipher stage. This output can then be used to encrypt/decrypt any subsequent input data. A different key is supplied to each of the cipher stages for each cycle.

19 Claims, 7 Drawing Sheets

MUTI-CYCLE NON-PARALLEL DATA ENCRYPTION ENGINE

TECHNICAL FIELD

The present invention relates to the field of encryption engines. More specifically, the present invention pertains to a multi-cycle, non-parallel DES encryption scheme.

BACKGROUND ART

Encryption is the act of transforming data into a form that is unrecognizable by an unauthorized party. Often, the encrypted data has the characteristics of a pseudo random number. Decryption is the act of returning this transformed data back into its original form. Generally, decryption is readily accomplished by an authorized user possessing knowledge of a secret, referred to as a "key." Thereby, successful data encryption maintains the privacy of the user by preventing unauthorized eavesdroppers from determining the content of the data. Without knowledge of the secret key, decryption is virtually impossible and breaking the code requires an extraordinary amount of time and computational resources. In current practice, secure private communication, especially over computer networks or digital phone lies, relies on encryption of the transmitted data. This is done to ensure the privacy and accuracy of the data being transmitted. For example, it is critical that financial exchanges (e.g., electronic money transfers from banks), military data, commercial transactions (e.g., airline reservations and ticket purchases), etc., be tamperproof and kept is strict confidence.

There exist many different strategies and methods for encrypting data. Generally, the more secure the encryption scheme, the longer it takes to perform the encryption/decryption. One encoding scheme that has gained widespread popularity and support is known as the Data Encryption Standard (DES). DES is a cryptographic encryption protocol adopted as a standard by the federal government and the American National Standards Institute. It has continued to serve as a federal standard up to the present date and is used extensively in business applications. Relevant documents describing DES include the National Bureau of Standards FIPS PUB 46 "Data Encryption Standard" (1977), FIPS PUB 81 "DES Modes of Operation" (1980), and FIPS PUB 74 "Guidelines for Implementing and Using the NBS Data Encryption Standard" (1981). Other relevant government documents include FIPS PUB 112 and 113, which specify DES use for password encryption and computer data authentication, respectively. The DES standard is unclassified and hence less formal explanations of the standard can also be found in standard public texts such as the book "Applied Cryptography" by Bruce Schneier. Currently, responsibility for reviewing DES and authenticating DES implementations lies with the National Institute of Standards and Technology (NIST) and the National Security Agency (NSA).

DES encrypts blocks of 64 bit plaintext input into blocks of 64 bit ciphertext by using a 56 bit key. The same key is used in both the encryption and decryption stage. The previously mentioned FIPS PUB 81, specified four modes of operation for DES: Electronic Codebook (ECB), Cipher Block Chaining (CBC), Output Feedback (OFB), and Cipher Feedback (CFB). The primary difference between these four modes is the effect one block can have on the encryption of subsequent blocks. In ECB mode, each 64 bit is encoded independently. In the other modes, previous blocks may also play a role in the encryption and hence, determine the ciphertext for a given block. As a result, the ECB mode is more vulnerable to attack from an adversary, whereas the other modes are more secure.

An advantage to using the ECB mode, however, is that it can deliver high encryption/decryption speeds. ECB can be implemented to run in parallel on a multi-processor machine or on multiple machines. This is accomplished by splitting the initial data into separate parts. Each individual part may then be processed simultaneously amongst the multiple processors, whereby each processor encodes its part independently. This allows for data to be encrypted and decrypted at extremely fast rates. The ability to encrypt/decrypt data at high speeds is important for a variety of real-time applications, such as voice communications and video teleconferencing. Furthermore, fast encryption/decryption is highly desirable for client-server applications where there is heavy traffic between networked personal computers accessing and updating data stored in a common database.

Unfortunately, the CBC, OFB, and CFB modes cannot take advantage of parallel processing because of the interdependencies between sequential blocks of data. In other words, one block of data is encrypted/decrypted according to a previously encrypted/decrypted block of data. Because of this feedback, randomness (i.e., entropy) is added to the encrypted data stream. In the past, designers have attempted to increase the encryption/decryption speed for these modes by incorporating additional circuitry. However, it may take a longer time for signals to propagate through the additional circuitry. Hence, the design of fast sequential hardware for DES remains an important technical problem. Furthermore, this approach is quite expensive because the additional circuitry also makes the die size larger. A larger die size directly translates into higher costs because less dies (i.e., semiconductor chips) can be fabricated from a given wafer. Moreover, prior art designs were specifically tailored to a single mode of operation. As a result, a design typically could not handle but only one mode of operation.

Thus, there is a need for a high-speed DES encryption and decryption mechanism that operates across all modes of operation. It would be preferable if such a mechanism were to operate at high speeds and were also cost effective to implement. The present invention offers such a solution. The present invention pertains to a novel hardware architecture for the implementation of a DES system which can be used in conjunction with all possible DES modes (ECB, CBC, OFB, and CFB) and which has a high throughput. These and other advantages of the present invention will become apparent within discussions of the present invention herein.

DISCLOSURE OF THE INVENTION

The present invention pertains to a multi-cycle, non-parallel DES encryption/decryption scheme that supports different modes of operation. In the currently preferred embodiment, three independent cipher stages are coupled together in series in order to implement a high-speed DES core. Since sixteen cipher operations are required for DES encryption or decryption, the input data is routed through the DES core five complete times. On the sixth pass, the encrypted/decrypted data is taken directly from the output of the first cipher stage. A unique key is supplied to each of the cipher stages during each cycle. In CBC, OFB, and CFB modes of operation, the final encrypted/decrypted data can be used in the encryption/decryption of subsequent data by applying an XOR function. A multiplexer is used to select either the output from the XOR or the output from the third cipher stage as an input to the first cipher stage. However, in the ECB mode, the XOR is bypassed, and subsequent data is fed directly to the first cipher stage. It should be noted that the present invention contemplates using different combinations and numbers of cipher stages, feedback paths, and output taps.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

The present invention provides a novel hardware design and implementation for a standard encryption scheme, the Data Encryption Standard. This invention will provide encryption for secure private communication at high speeds with a throughput of at least 355 Megabits per second for the CBC mode. The success of the present invention will allow faster DES hardware to be used in a wide range of applications at an acceptable cost. Following standard terminology, when addressing the encryption process, the original message shall be referred to as plaintext, and the encrypted message shall be referred to as the ciphertext. An unauthorized user attempting to decrypt ciphertext shall be referred to as an adversary.

Figure 1:
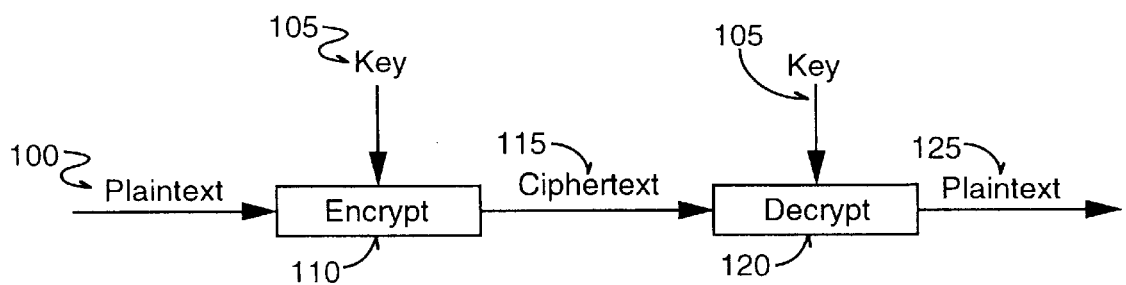
FIG. 1 represents a standard model for a key-based encoding device using a single key.

FIG. 1 represents a standard model for a key-based encoding device using a single key. The message, or plaintext 100, undergoes encryption based on a key 105 and an encryption method 110. The key is chosen by the user and must be kept secret. The security of the encoding depends upon the secrecy of the key. The resulting output from the encoding is referred to as the ciphertext 115. With knowledge of the key 105 and the proper decryption algorithm 120, the ciphertext can be transformed back into the original plaintext 125. This paradigm can be applied universally in a wide range of settings using a variety of underlying hardware or software schemes.

Figure 2:
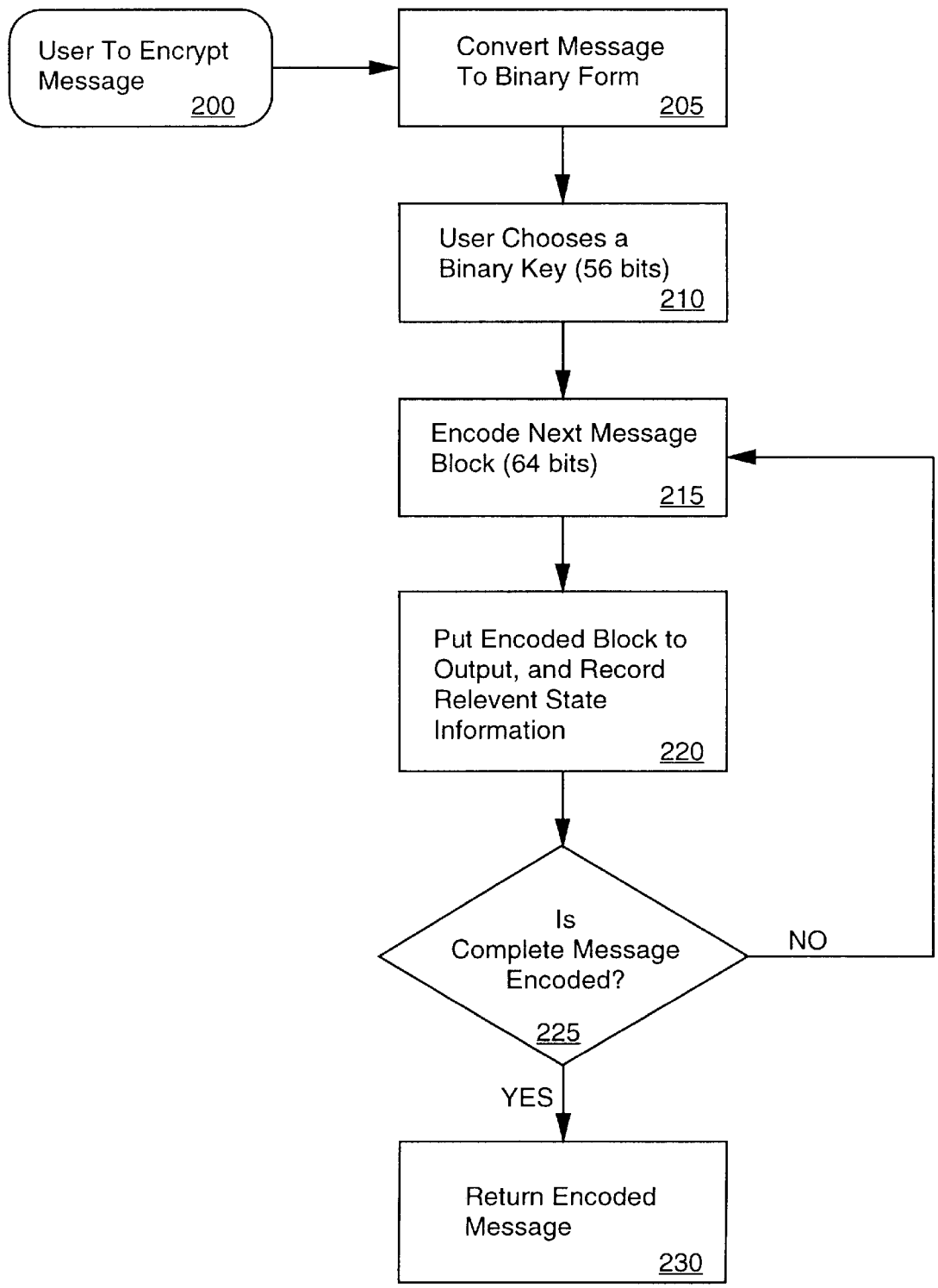
FIG. 2 is a flowchart describing the steps of how a message is transformed into the corresponding ciphertext.

The Digital Encryption Standard, or DES, is an example of a key-based encryption scheme using a single key. FIG. 2 is a flowchart describing the steps of how a message in step 200 is transformed into the corresponding ciphertext. The message is taken to be in binary form, step 205. The user is assumed to have chosen a 56 bit secret key, step 210. The message is encoded in 64 bit blocks, step 215. An encoded 64 bit block produces at 64 bit output block, step 220. Since only 64 bit blocks are acceptable, if the last block is not 64 bits in length, it is generally padded with some regular pattern (a sequence of 0's, for example). The 64 bit blocks are encoded until the entire initial message is encoded, step 225. Next, the output blocks are concatenated to form the final encoded message, step 230. It should be noted that an encoding can also produce some state information which can be used in the encoding of subsequent blocks, step 220. This step is described in detail in the documentation specifying the DES standard. For example, in electronic codebook (ECB) mode, no such state information is used; each block is encoded independently. In cipher block chaining (CBC) mode, the plaintext is XORed with the previous ciphertext block before it is encrypted. The decryption method is entirely similar and is accomplished using the same key that is used for the encryption.

Figure 3:
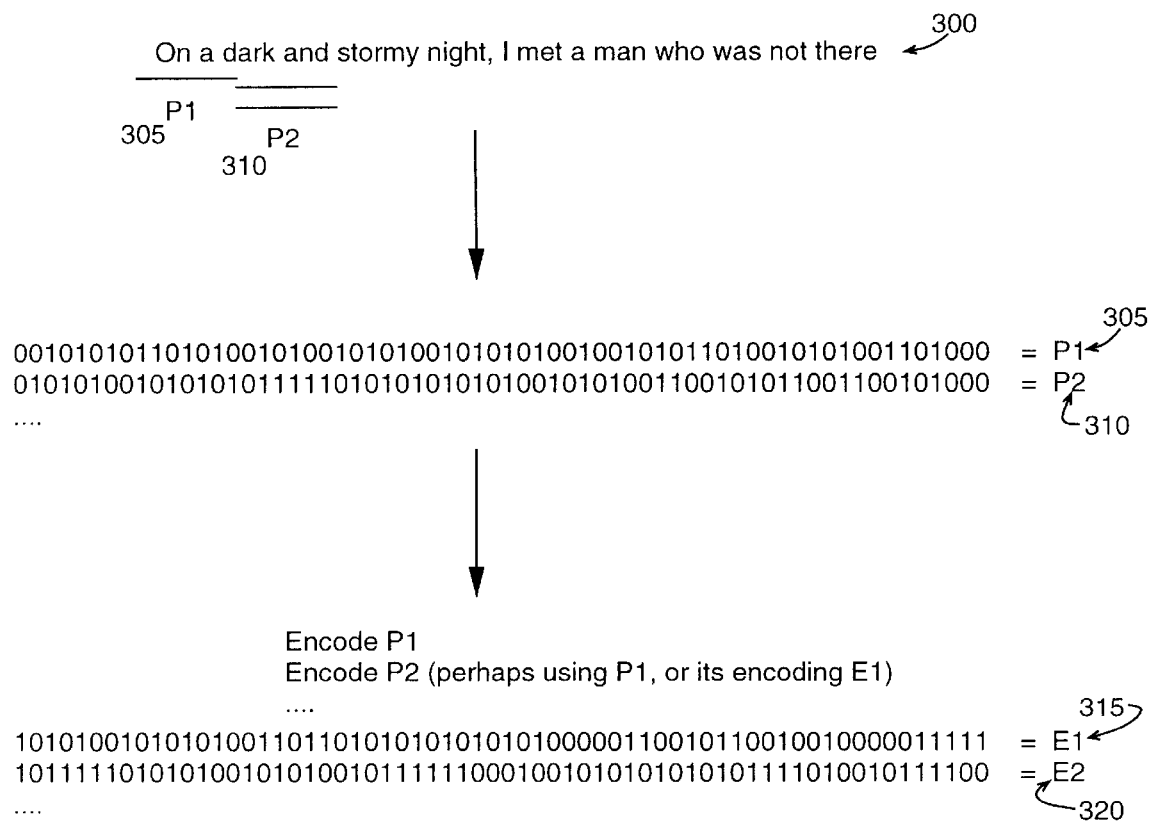
FIG. 3 illustrates a detailed example of the functionality of the DES encryption process.

FIG. 3 illustrates a detailed example of the functionality of the DES encryption process. The user has a plaintext message 300 to be encoded. The plaintext message is divided into 64 bit blocks P1, P2, etc., as indicated by 305 and 310. The 64 bit blocks are encoded sequentially into apparently random 64 bit strings E1, E2, etc., as shown by reference numerals 315 and 320. Finally, the encoded output consists of the concatenation of the strings E1, E2, and so on.

Figure 4:
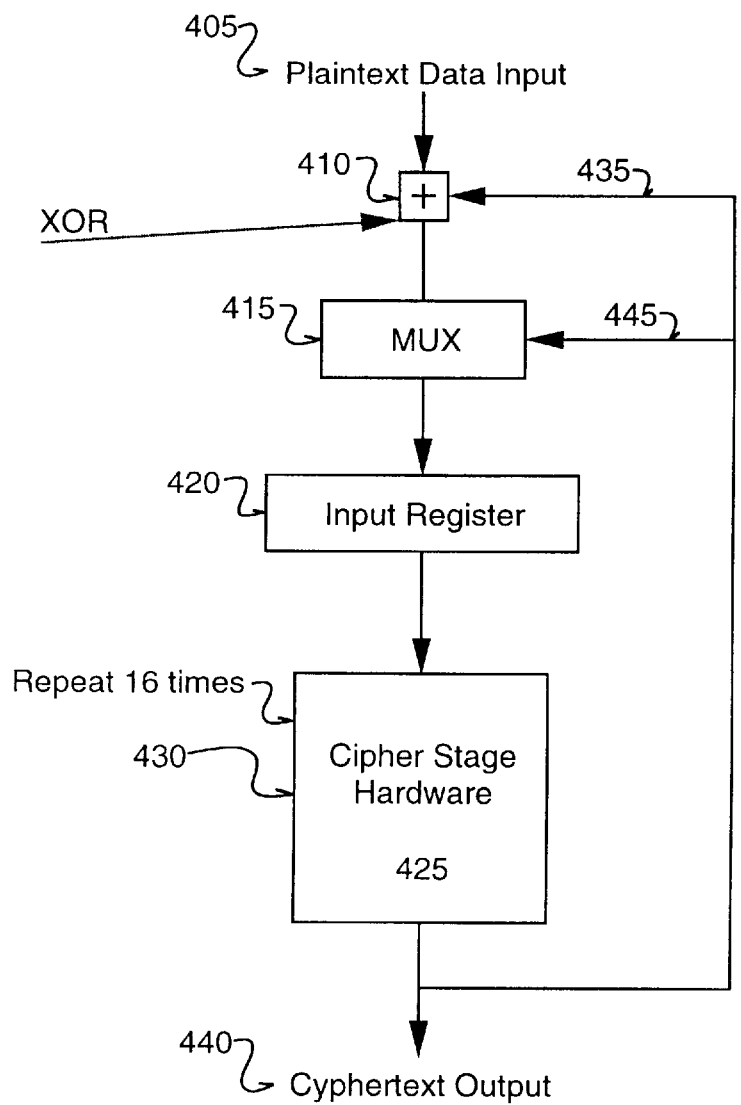
FIG. 4 is a block diagram showing the important features of a standard hardware implementation of the DES encryption scheme in CBC mode.

FIG. 4 is a block diagram showing the important features of a standard hardware implementation of the DES encryption scheme in CBC mode. The plaintext input to the DES hardware consists of a 64 bit block 405. There are sixteen rounds of identical operations. Each of these sixteen identical rounds shall be referred to as a cipher stage 425 and 430. The result from one cipher stage is used as the input to the next cipher stage for the second to the sixteenth stage 445. The determination of whether the input to the cipher stage 425 should come from the plaintext 405 or the last cipher stage output 445 is determined by a multiplexer 415 that passes the result to the appropriate input register 420. After sixteen cipher stages, the resulting yields the output ciphertext block 440. In the CBC mode, the output ciphertext is combined with the next 64 bit block 435 using an exclusive or (XOR) operation 410. Other modes and decryption use the same principle architecture. For example, in the ECB mode, the XOR operation 410 is simply bypassed altogether.

In standard implementations, each cipher stage takes one cycle. Here, a cycle refers to a unit of time in which the underlying machine can perform one operation. The actual clock time for a cycle varies from machine to machine. Because all cipher stages are similar in standard implementations, the hardware for only one cipher stage 425 is shown. The cipher operation is repeated sixteen times using the same hardware 430. For each cycle, the input to the cipher stage is determined by the output from the previous cipher stage. This standard methodology reduces the overall hardware cost and silicon area required by having only one cipher stage. The drawback is that this methodology induces speed limitations, because sixteen cipher stages in sixteen different cycles are required.

Figure 5:
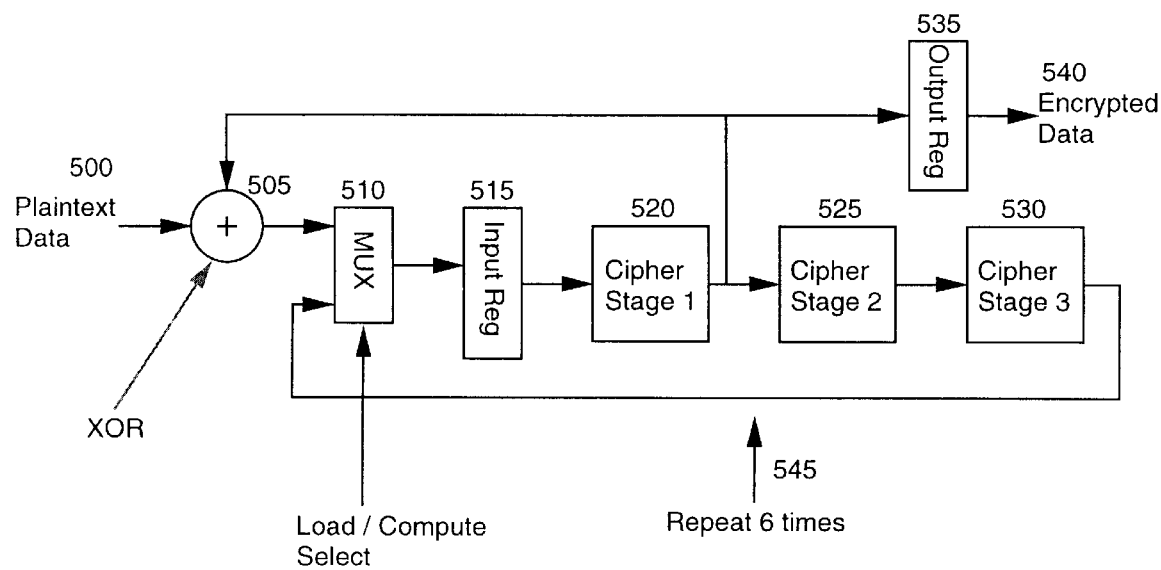
FIG. 5 shows a block diagram of the currently preferred embodiment of the DES implementation of the present invention.

The present invention differentiates itself with a novel architecture that circumvents the speed limitation of the standard implementation. FIG. 5 shows a block diagram of the currently preferred embodiment of the DES implementation of the present invention. All of the different modes of operation may be practiced on this implementation. Furthermore, this same principle architecture can be used to decrypt any received data that had been DES encrypted. Initially, the plaintext data 500 is used as the input 515. In CBC mode, the plaintext will first undergo an exclusive or (XOR) operation with the previous ciphertext output by XOR gate 505. The present invention uses three cipher stages per cycle 520, 525, 530 in place of the single cipher stage of the standard architecture 415. Hence, only six cycles 545 (i.e., five full cycles and the output is pulled from the first cipher stage 520 in the sixth cycle) are required in place of sixteen. A multiplexer 510 in the system keeps track of how many cycles have been completed and hence whether the data to be fed to the input register 515 should come from the plaintext input 500 or the last cipher stage 530. On the sixth cycle, the output register 535 is loaded with the output from the first cipher stage 520, and this is produced as the output 540. Note that the five complete cycles and the sixth partial cycle yields sixteen cipher stages, as prescribed by the DES standard.

Since the invention implementation requires three cipher stages, one might expect that the hardware cost would be three times as much as the standard implementation. The cost of the invention in terms of silicon and hardware size is reduced by suitable design. By channeling information suitably in the hardware the cost of three cipher stages can be less than three times the cost of a single cipher stage, and hence the improvement in speed does not require an inversely proportional rise in cost.

Furthermore, it should be noted that the actual time for one cycle in the current invention must be long enough so that the three cipher stages have time to conclude within one cycle period. The currently preferred implementation is designed to perform at 33 Mhz with 0.6 $\mu$m process technology, although greater speeds will become possible with improvements in silicon technology. This implementation yields a throughput of at least 355 Megabits per second, obtaining a high performance/price ratio.

Figure 6:
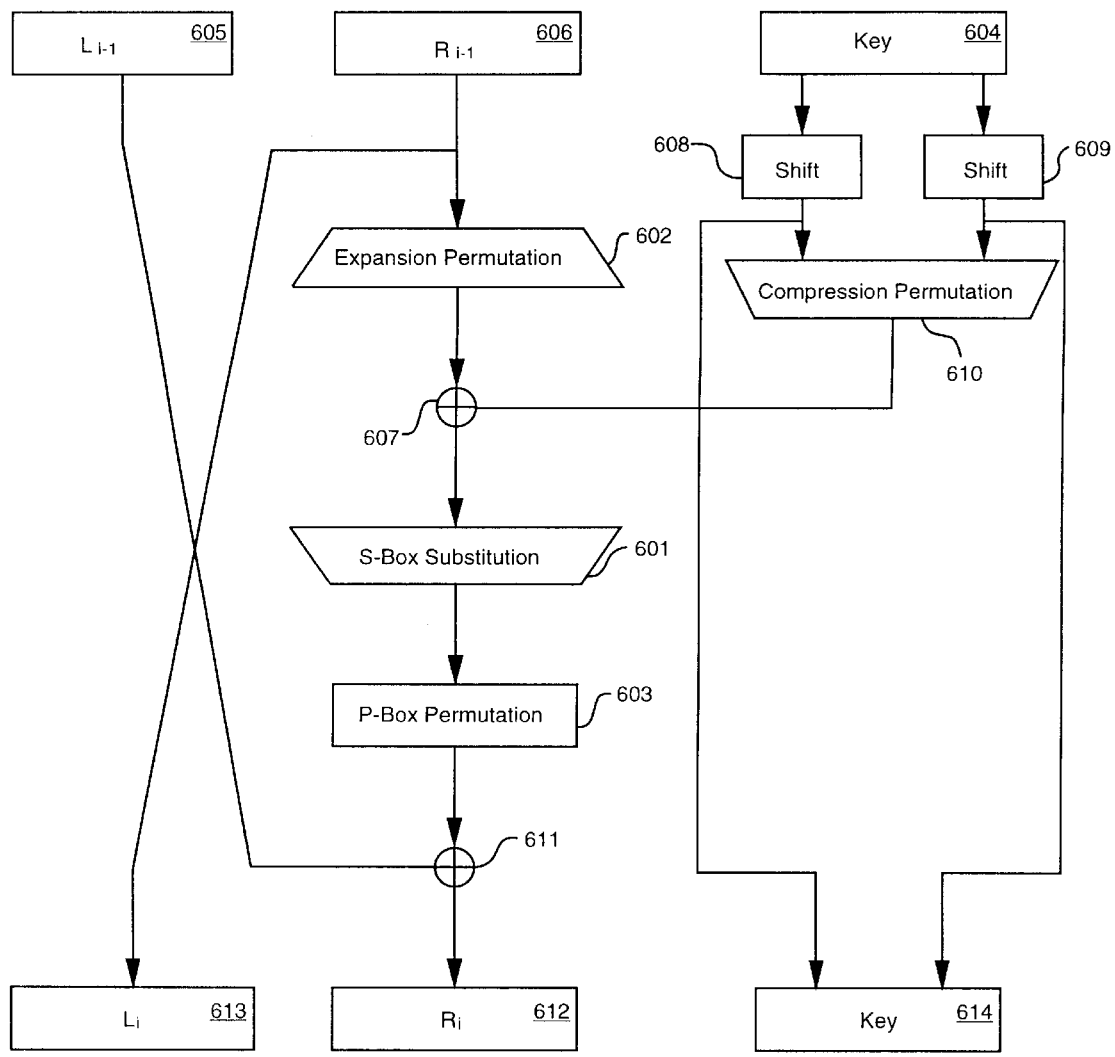
FIG. 6 shows a circuit diagram of an exemplary cipher stage.

FIG. 6 shows a circuit diagram of an exemplary cipher stage. At its most basic level, the DES algorithm is comprised of a combination of two fundamental techniques of encryption: confusion and diffusion. Accordingly, a cipher stage utilizes this principle by performing a substitution 601 in conjunction with permutations 602 and 603 on the plaintext, based on the key 604. Initially, the 64-bit block of plaintext is initially divided into a 32-bit left half (L) and a 32-bit right half (R). The letter "i" is used to designate the current iteration. Hence, the Li-1 block 605 represents the 32-bit left-half result of a previous iteration. Likewise, the Ri-1 block 606 represents the corresponding 32-bit right-half result of that previous iteration. The Ri-1 data is input to the expansion permutation block 602. The expansion permutation expands the right-half of the data from 32 bits to 48 bits. Essentially, this operation changes the order of the bits as well as repeats certain bits. The goal is to make the right-half the same size as the key for the XOR operation 607. Furthermore, it provides a longer result that can be compressed during the substitution process 601. Crytographically, the expansion permutation 602 allows one bit to affect two substitutions. Consequently, the dependency of the output bits on the input bits spreads faster. DES is designed to reach the condition of having every bit of the ciphertext depend on every bit of the plaintext and every bit of the key as quickly as possible.

At the same time, the 64-bit key 604 is transformed. It is reduced to a 56-bit key by ignoring every eighth bit. These bits can be used as a parity check to ensure that the key is error-free. After the 56-bit key is extracted, a different 48-bit subkey is generated for each of the 16 cipher stages as follows. First, the 56-bit key is divided into two 28-bit halves, Next, shifters 608 and 609 circularly shift the halves to the left by either one or two bits, depending on the particular cipher stage. Thereupon, a compression permutation 610 is used to permutate the order of the bits as well as select a 48-bit subset of bits. Because of the shifting, a different subset of key bits is used in each subkey. Moreover, each bit is used in approximately 14 of the 16 subkeys, although not all bits are used in exactly the same number of times. The resulting compressed key is then input to the XOR gate 607.

After the compressed key is XORed 607 with the expanded block, the 48-bit result is input to an S-box substitution 601. The substitutions are performed by eight different substitution boxes. Each S-box has a 6-bit input and a 4-bit output. The 48 bits are divided into eight 6-bit sub-blocks. Each separate block is operated on by a separate S-box. Each S-box is comprised of a table of 4 rows and 16 columns. Each entry in the box corresponds to a 4-bit number. The 6 input bits of the S-box specify under which row and column number to look for the output. The non-linearity of the S-boxes renders DES secure. Next, the 32-bit output from S-box substitution 601 is permutated by the P-box permutation 603. This permutation maps each input bit to an output position. No bits are used twice, and no bits are ignored. In other words, a straight permutation is performed.

The result from the P-box permutation 603 is XORed 611 with Li-1 605 to generate the right-half data Ri 612 for the current iteration. The left-half data Li 613 for the current iteration is taken directly from the right-half Ri-1 606 of the previous iteration. Lastly, the shifted key 614 is used in the following iteration.

Figure 7:
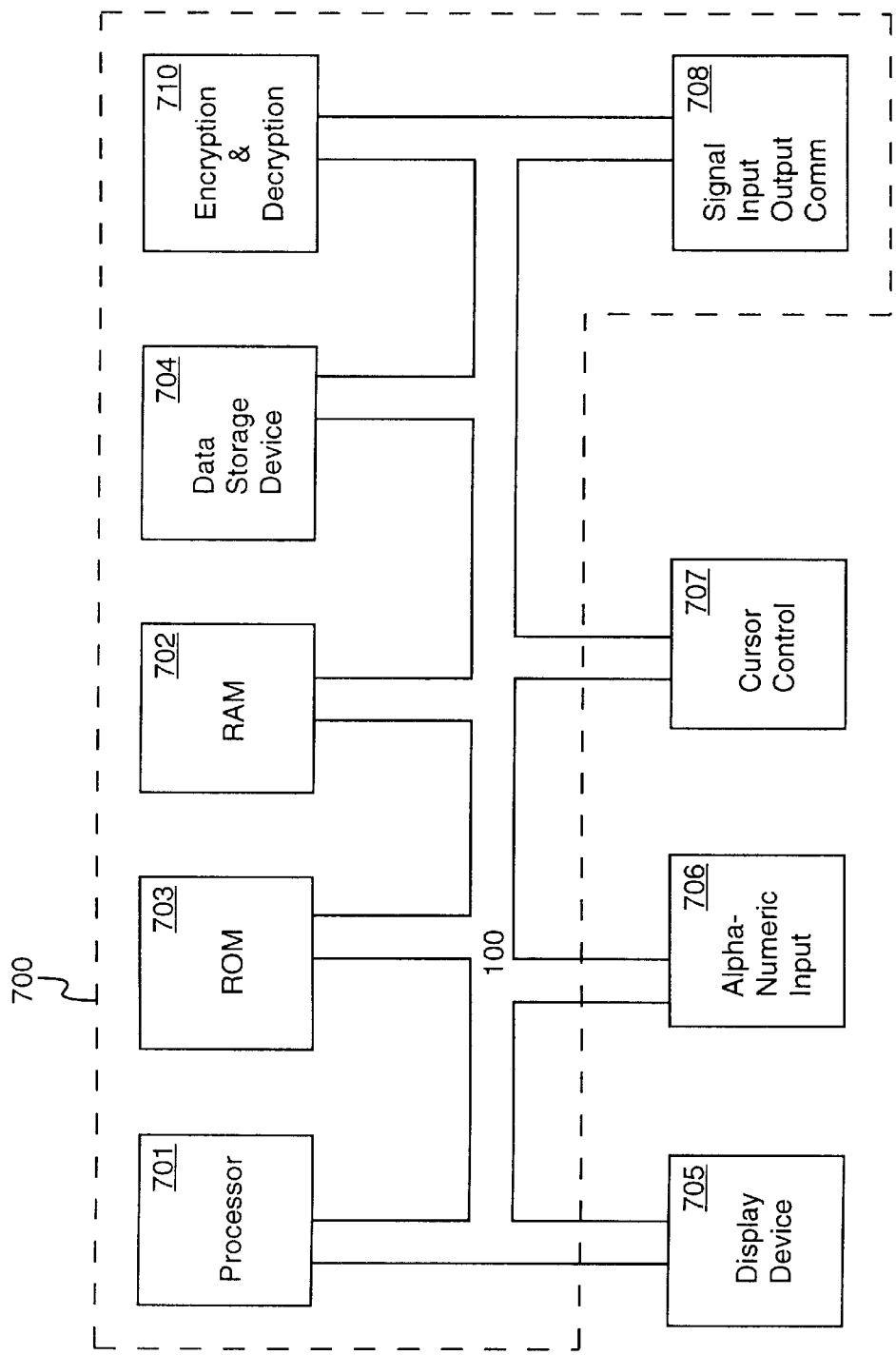
FIG. 7 illustrates an exemplary computer system 700 upon which the present invention may be implemented or practiced.

FIG. 7 illustrates an exemplary computer system 700 upon which the present invention may be implemented or practiced. It is appreciated that the computer system 700 of FIG. 7 is exemplary only and that the present invention can operate within a number of different computer systems including general purpose computers systems, embedded computer systems, and computer systems specially adapted for secure transmissions. Computer system 700 of FIG. 7 includes an address/data bus 709 for conveying digital information between the various components, a central processor unit (CPU) 701 for processing the digital information and instructions, a random access memory (RAM) 702 for storing the digital information and instructions, a read only memory (ROM) 703 for storing information and instructions of a more permanent nature. In addition, computer system 700 may also include a data storage device 704 (e.g., a magnetic, optical, floppy, or tape drive) for storing vast amounts of data, and an I/O interface 708 for interfacing with peripheral devices (e.g., computer network, modem, etc.). Furthermore, an encryption and decryption circuit 710 may be used to encode outbound messages and decode received messages that were encrypted by the sender. Devices which may be coupled to computer system 700 include a display device 705 for displaying information (e.g., channel grid map, vertical constraint graphs, weighting functions, feasible links, etc.) to a computer user, an alphanumeric input device 706 (e.g., a keyboard), and a cursor control device 707 (e.g., mouse, trackball, light pen, etc.) for inputting data and selections.

The preferred embodiment of the present invention, is thus described. While the present invention has been described in particular embodiments, it should be appreciated that the present invention should not be construed as limited by such embodiments, but rather construed according to the below claims.

What is claimed is:

1. A method for safeguarding data transmissions, comprising the steps of:

inputting unencrypted data to a multiplexer;

selecting the unencrypted data for input to a first cipher stage of a plurality of cipher stages that are coupled together in series, wherein encryption is performed by each of the cipher stages;

feeding back an output from a last cipher stage of the plurality of cipher stages to the multiplexer;

selecting the output from the last cipher stage for input to the first cipher stage;

cycling through the plurality of cipher stages N times;

outputting from one of the plurality of cipher stages a final encrypted data after N cycles have completed.

2. The method of claim 1 further comprising the step of XORing the unencrypted data with an initial vector before the unencrypted data is input to the first cipher stage.

3. The method of claim 2 further comprising the step of multiplexing between an output from an XOR gate and the output from the last cipher stage, wherein the output from the multiplexer is input to a register coupled to an input of the first cipher stage.

4. The method of claim 1, wherein the cipher stages encrypt the data according to a plurality of keys which are different for each cipher stage of each cycle of the encryption process.

5. The method of claim 1, wherein there are three cipher stages, N equals 5, and the final output is taken from the output from the first cipher stage, such that the data is encrypted sixteen times.

6. The method of claim 1, wherein the cipher stages correspond to a cipher block chaining mode of operation.

7. The method of claim 1, wherein the cipher stages correspond to a output feedback mode of operation.

8. The method of claim 1, wherein the cipher stages correspond to a cipher feedback mode of operation.

9. The method of claim 1, wherein the cipher stages correspond to a cipher feedback mode of operation.

10. The method of claim 1, wherein the cipher stages correspond to an electronic codebook mode of operation.

11. The method of claim 1, wherein the data is encrypted and decrypted according to 16 cipher operations.

12. An apparatus for encoding or decoding data comprising:

an XOR gate for XORing unencrypted data with previously encrypted data;

a multiplexer coupled to the XOR gate, wherein the multiplexer selects between an output from the XOR gate and an output from a last cipher block as an input to a first cipher block;

a plurality of cipher blocks coupled in series to the multiplexer, wherein the data is encrypted by each of the cipher blocks and encrypted data processed by one cipher block is input to a following cipher block;

a feedback path coupled from an output of the last cipher block to an input of the multiplexer, wherein the multiplexer inputs data from the last cipher block to the first cipher block for encryption N cycles through the plurality of cipher blocks;

an output register coupled to an output of one of the plurality of cipher blocks for storing the encrypted data.

13. The apparatus of claim 12, wherein the previously encrypted data is comprised of an initial vector before the data is input to the first cipher block.

14. The apparatus of claim 13, wherein the cipher blocks encrypt the data according to a plurality of keys which are different for each cipher stage of each cycle of the encryption process.

15. The apparatus of claim 14, wherein there are three cipher blocks, N equals 5, and the final output is taken from the output from the first cipher block, such that there are sixteen cipher cycles.

16. The apparatus of claim 12, wherein the cipher stages include data encryption standard cipher block chaining, output feedback, cipher feedback, and electronic codebook modes of operation.

17. A method of encrypting or decrypting data, comprising the steps of:

a) inputting the data to an XOR gate;

b) XORing the data with an output from a first cipher stage;

c) multiplexing an output from the XOR gate with an output from a third cipher stage;

d) storing an output signal from the multiplexer in a register;

e) encrypting/decrypting data stored in the register by the first cipher stage to generate a first encrypted/decrypted block of data;

f) generating a second encrypted/decrypted block of data by a second cipher stage processing the first encrypted/decrypted block of data;

g) generating a third encrypted/decrypted block of data by the third cipher stage processing the second encrypted/decrypted block of data;

h) multiplexing an output of the third cipher stage as an input to the first cipher stage;

i) repeating steps e-h N times;

j) inputting a signal from the third cipher stage after the Nth time and taking the output signal from one of the cipher stages such that the data is encrypted/decrypted through M cycles.

18. The method of claim 17, wherein the cipher stages encrypt the data according to a plurality of keys which are different for each cipher stage of each cycle of the encryption process.

19. the method of claim 16, wherein the cipher stages include data encryption standard cipher block chaining, output feedback, cipher feedback, and electronic codebook modes of operation.

* * * * *